United States Patent
Mahankali et al.

(10) Patent No.: US 11,594,987 B1
(45) Date of Patent: Feb. 28, 2023

(54) DEGAUSS TIME DETECTION IN ELECTRIC MOTORS

(71) Applicant: TEXAS INSTRUMENTS INCORPORATED, Dallas, TX (US)

(72) Inventors: Venkata Pavan Mahankali, Bangalore (IN); Ganapathi Hegde, Bangalore (IN); Krushal Shah, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/514,171

(22) Filed: Oct. 29, 2021

(51) Int. Cl.
*H02P 6/182* (2016.01)
*H02P 6/21* (2016.01)

(52) U.S. Cl.
CPC .............. *H02P 6/182* (2013.01); *H02P 6/21* (2016.02)

(58) Field of Classification Search
CPC .................................. H02P 6/182; H02P 6/21
USPC ................. 318/400.11, 400.09, 400.01, 700
See application file for complete search history.

(56) References Cited

U.S. PATENT DOCUMENTS 7,372,653 B2 * 5/2008 Suzuki .................. G11B 5/465

\* cited by examiner

*Primary Examiner* — David Luo
(74) *Attorney, Agent, or Firm* — Valerie M. Davis; Frank D. Cimino (57) ABSTRACT

Example systems and processes compare sampled values of a floating phase voltage and/or outgoing phase current of an electric motor with a corresponding reference to identify a degauss time period. Post degauss time period identification, sampled values are compared with a threshold to identify a settling time period following the degauss time period. The threshold used to identify the settling time period depends on a slope of a floating phase voltage after the degauss time period, a modulation scheme being used, and a pulse width modulation ON/OFF state of the electric motor. When the threshold comparison test is not met, it is determined whether the slope of the floating phase voltage has inverted. Based on such processing, a back-electromotive force (BEMF) zero-crossing (ZC) is detected or estimated with respect to a floating phase voltage of the electric motor.

20 Claims, 8 Drawing Sheets

DEGAUSS TIME DETECTION IN ELECTRIC MOTORS

FIELD OF DISCLOSURE

This disclosure relates to improving start-up or acceleration of electric motors, and more particularly to identifying a degauss time period and detecting a back-electromotive force (BEMF) zero-crossing (ZC) whether it occurred during or after the degauss time period to improve electric motor performance.

BACKGROUND

Brushless, direct current (BLDC) electric motors are used in many industrial and commercial applications. Because of their high-power density and low maintenance, BLDC electric motors have been, and are continuing to be, widely employed in automation applications.

Conventional sensorless trapezoidal commutation control techniques use back-electromotive force (BEMF) information of the floating phase voltage to detect rotor position and thus commutate the BLDC motor. However, in trapezoidal commutation, whenever current changes from one phase to another, while the outgoing phase current decays, the floating phase voltage is usually clamped to either Vcc or ground. This clamped period is usually blanked out or masked for a few pulse width modulation (PWM) cycles based on the maximum current rating of the motor. This clamping/masking period is used to approximate a corresponding degauss time period, which is usually a fixed time period determined by a fixed time count. In some methods the masking period is determined based on the speed and load of the motor. That is, the masking window is computed based on the previous cycle time with a fixed angle based on load/duty cycle. Using conventional masking methods, BEMF information is not available for rotor position sensing during the masking periods.

However, a fixed, pre-tuned masking period to approximate the degauss time period is not suitable for all applications. In applications in which the load changes suddenly (e.g., during fast start-up/acceleration or when motor torque demand is very high) the actual degauss time period varies for different loads and speeds. Whenever there is a sudden change in speed or load, the degauss time period changes, which affects the floating phase voltage and, in turn, affects BEMF measurement. Using a fixed mask period, particularly in applications in which speed or load may change suddenly, may lead to incorrect BEMF detection and thus large errors in identified commutation points, which in turn may result in loss of torque and even stalling of the motor.

It is important to avoid the degauss time period for detecting BEMF ZC and for sampling BEMF to obtain rotor position information after the current commutates from one phase to next. Hence, it is important to accurately determine the degauss time period, so as not to detect a false ZC. It is also important to accurately determine the rotor position and thus commutation points to enable the motor to deliver peak torque under a wide range of operational conditions.

In this context, features and aspects of the invention arise.

SUMMARY

In accordance with an example process of operating an electric motor, an electrical quantity of the electric motor is sampled at a plurality of different times to generate sampled values. Each of the sampled values is then compared with a reference to identify a clamped time period during which a magnitude of one or more pulses of a floating phase voltage of the electric motor are clamped to a set value by an outgoing phase current of the electric motor. Based on the comparisons, a degauss time period is identified. A back-electromotive force (BEMF) zero-crossing (ZC) is detected based on the identified degauss time period.

Another example of a process of operating an electric motor comprises: sampling an electrical quantity of the electric motor at a plurality of different times to generate sampled values; comparing each of the sampled values obtained during an initial time period to a reference in a reference test; and determining whether the reference test is met with a set number of compared sample values; identifying the degauss time period and a settling time period following the degauss time period, when the reference test is met with the set number of compared sampled values; detecting whether a slope of a floating phase voltage of the electric motor has inverted, when the reference test is not met with the set number of compared sampled values; and determining a BEMF ZC with respect to the floating phase voltage.

In accordance with an example, a system, e.g., a motor control system, comprises measurement logic configured to sample an electrical quantity of an electric motor at a plurality of different times to generate sampled values; detection logic coupled to the measurement logic; and control logic coupled to the measurement and detection logic, the control logic configured to identify a degauss time period during which a magnitude of pulses of a floating phase voltage of the electric motor is clamped to a set value by an outgoing phase current of the electric motor, and to identify a settling time period, following the degauss time period, during which the floating phase voltage settles from the set value to a beginning ramping value at which the floating phase voltage begins to ramp.

These and other features will be better understood from the following detailed description with reference to the accompanying drawings.

BRIEF DESCRIPTION OF THE DRAWINGS

Features of the disclosure may be understood from the following figures taken in conjunction with the detailed description.

The same reference numbers and other reference designators are used in the drawings to designate the same or similar (structurally and/or functionally) features.

DETAILED DESCRIPTION

Specific examples are described below in detail with reference to the accompanying figures. These examples are not intended to be limiting. The objects depicted in the drawings are not necessarily drawn to scale. Graphical representations are likewise not necessarily drawn to scale and are approximations.

In example arrangements, degauss time periods are accurately identified over a range of motor operating conditions, eliminating the need for tuning parameter(s) to mask such degauss time periods. In an example, accurate identification of degauss time periods, as described herein, enables more accurate detection of BEMF ZC points including those that occur during degauss time periods, and thus provides peak torque performance at a wide range of operational conditions of sensorless trapezoidal drive. In an example, phase voltages and/or phase currents are sampled to identify degauss time periods. In an example, it is also determined when the floating phase voltage has settled (e.g., reached a certain low voltage threshold), after the immediately preceding degauss time period. In an example, BEMF ZC points are detected or determined including whether a BEMF ZC occurred during a degauss time period.

Figure 1:
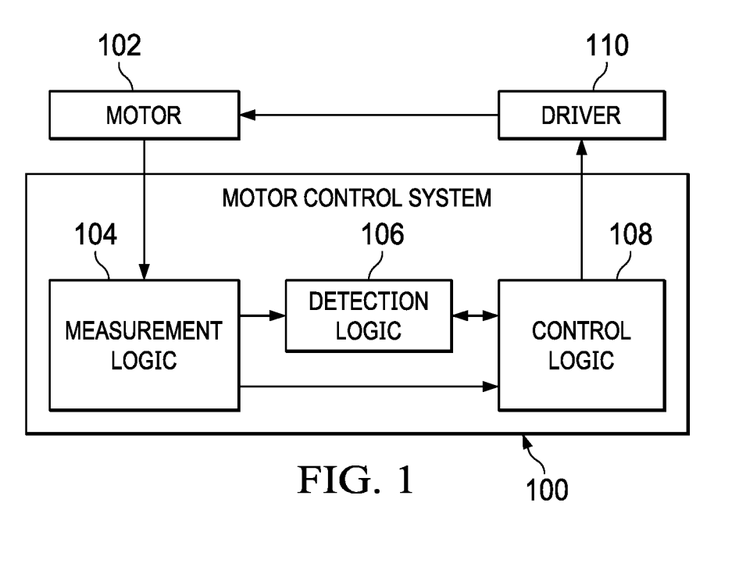
FIG. 1 is a block diagram illustrating an example motor control system to control operation of an electric motor.

FIG. 1 illustrates an example of a motor control system 100 configured to control a motor 102, which may be an electric, three-phase, BLDC motor. System 100 may be used to perform the measurements and processing described herein. System 100 includes logic (e.g., implemented in a motor controller) that is configured to receive feedback from electric motor 102 and based on such feedback control operation of motor 102, which control includes determining or identifying degauss time periods, determining or identifying the settling of the floating phase voltage following a degauss time period, and detecting or determining BEMF ZC points including any that occur during a degauss time period.

To that end, example system 100 includes measurement logic 104, detection logic 106, and control logic 108. Control logic 108 is coupled to a driver 110 that is configured to supply electric current to phase windings of motor 102 in response to control signals provided by control logic 108. In some examples, some or all of the logic may be fabricated as part of a motor controller implemented on a common substrate, e.g., integrated in a common chip or die. For example, system 100 and its logic blocks may be implemented as hardware on a silicon chip, in an integrated circuit, in a field-programmable gate-array (FPGA), and/or with discreet logic devices. More generally, the functionality of system 100 may be implemented in a variety of ways consistent with the teachings herein.

Figure 2:
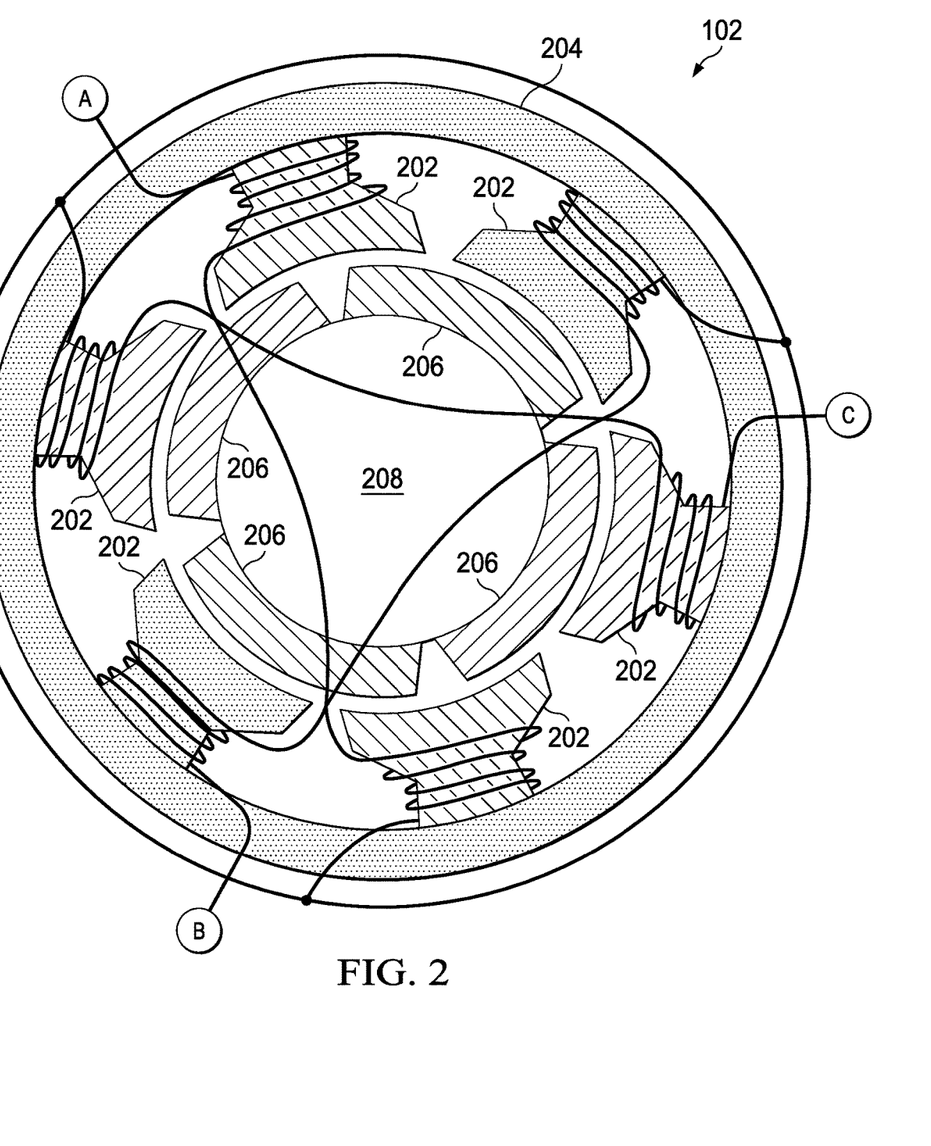
FIG. 2 is a schematic diagram of an example BLDC electric motor.

As shown in FIG. 2, electric motor 102 may include non-permanent electromagnetically activated magnets (electromagnets) 202 mounted in the motor's stator 204 and may have permanent magnets 206 mounted to rotor 208 which is positioned centrally to stator 204. However, the control techniques described herein may be applied to other electric motor arrangements, i.e., having different numbers of permanent magnets and electromagnets. In the illustrated example of FIG. 2, electromagnets 202 of stator 204 may be activated with six commutation states that work in pairs to generate the phase voltages and phase currents to rotate rotor 208.

Returning to FIG. 1, in an example, measurement logic 104 is configured to sample phase voltages and phase currents of motor 102. Measurement logic 104 may include sampling and conversion circuitry, e.g., an analog-to-digital converter (ADC) that includes a sample-and-hold circuit, to periodically sample the phase voltages and/or phase currents and generate a corresponding digital value for each sample. The sampling interval may be set to any suitable time period considering the operating parameters and run state (e.g., duty cycle) of motor 102. These sampled phase voltage points and/or sampled phase current points are provided to control logic 108 for comparisons with various references or thresholds.

In a three-phase motor, with 120-degree trapezoidal operation, one of the three phase voltages is floating during each 60-degree commutation interval. Each floating phase, which may be increasing or decreasing, includes the BEMF voltage for that interval. During that same interval, one of the other phase voltages is conducting. Thus, in each electrical cycle of motor 102 each phase voltage has conducting and non-conducting (floating) components. Typically, a zero-crossing (ZC) occurs in the BEMF of each floating component.

To that end, detection logic 106 is configured to detect ZC locations of the BEMF voltage based on the sampled data and information received from control logic 108, but such feature may only be enabled only after the end of each degauss time period is identified so as not to incorrectly detect a ZC when one did not actually occur. That is, once control logic 108 determines the start of the floating phase voltage that holds true BEMF information, control logic 108 may activate detection logic 106 to detect BEMF ZC. Thus, detection logic 106 and control logic 108 may be in bidirectional communication to facilitate this processing.

Control logic 108, which may be in direct communication with measurement logic 104, may include circuitry, e.g., comparators, to compare the sampled values obtained by measurement logic 104 with any of various references or thresholds. For example, sampled phase current values may be compared with a zero-value current reference and/or the sampled phase voltage values may be compared with a supply voltage reference, e.g., Vcc or zero voltage reference, i.e., ground. In the case of comparing the sampled phase voltages, such comparison is to Vcc or ground, depending on whether BEMF is increasing or decreasing, respectively. The direction of BEMF (increasing or decreasing) depends, in turn, on the commutation state of motor 102 and spin direction of rotor 208. Based on these comparisons, control logic 108 identifies when the floating phase voltage is clamped, e.g., to either Vcc or ground, which identification is used to identify the corresponding degauss time period and when it ends. In practice, the clamped phase voltage does not instantaneously settle to a point where linear ramping begins. Rather, there is a settling time period before the floating phase voltage represents true BEMF information. To also identify this settling time period and its end, control logic 108 (or motor controller 306) takes into consideration the PWM ON/OFF state, together with information as to whether the floating phase voltage is increasing or decreasing and the particular modulation scheme being used, to detect the start of true BEMF information in the floating phase voltage.

After control logic 108 determines that the floating phase voltage is no longer clamped, has settled and is now ramping to reflect true BEMF information, control logic 108 compares, e.g., using a suitable comparator, sampled phase voltage values during that time frame to detect the BEMF ZC point.

Based on the information received from detection logic 106 and the comparisons performed by control logic 108, each degauss time period and subsequent settling time period can be accurately detected. Once such detection has occurred, BEMF ZC points may be detected in the floating phase voltage holding true BEMF information. Such ZC detection information may then be used for to track the position of the rotor 208 of motor 102.

With ZC detection information, as well as commutation information available, control logic 108 may then control driver 110 to adjust acceleration of motor 102 based on such information. For example, during open-loop (start-up) operation, control logic 108 may adjust first order acceleration rates to sufficiently accelerate motor 102 to meet the torque demand of motor 102 based on its applied current limit, while control logic 108 is receiving motor operation information from detection logic 106. Control logic 108 may also store, or have access to, an open-loop profile for motor 102. The open-loop profile includes speed and acceleration profiles, as well as ZC locations and commutation points that may be compared with detected ZC locations and commutation points, respectively. Control logic 108 sends control signals to driver 110 to further accelerate or decelerate motor 102 to correct the phase angle error of rotor 208. When the phase angle error is sufficiently aligned or within a certain tolerance, e.g., within 15 electrical degrees, motor 102 is switched to closed-loop operation. Driver 110 supplies current to excite windings of motor 102 in response to the control signals supplied by control logic 108.

Figure 3:
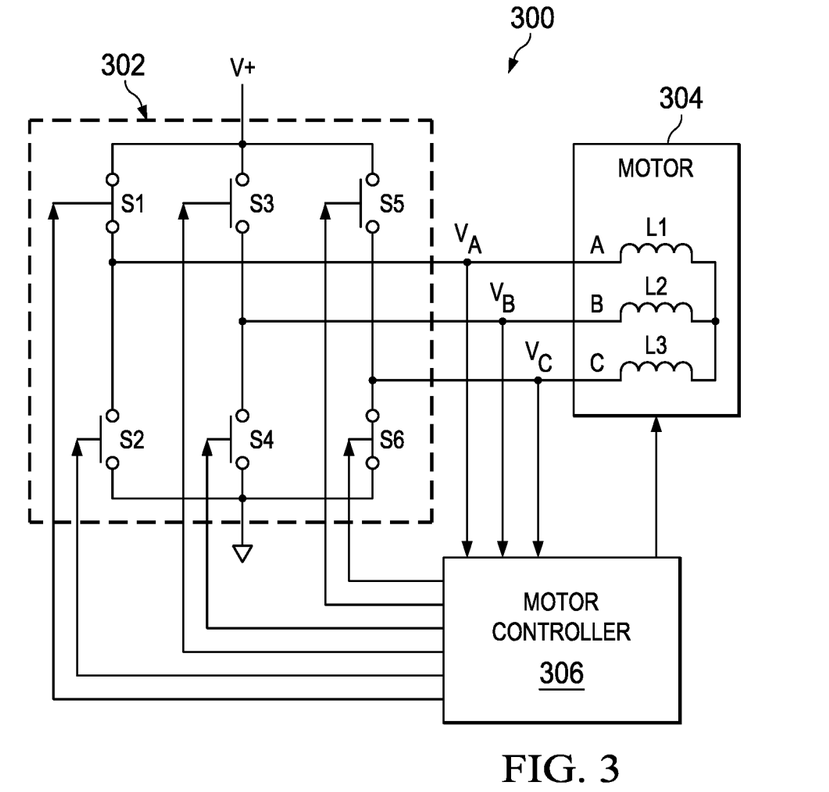
FIG. 3 is a block diagram of an example electric motor system.

FIG. 3 illustrates an example of a motor system 300 that includes a driver 302 coupled to a motor 304, which is represented as an electric three-phase motor having phase windings A, B and C through which three phase currents flow, respectively. In the example of FIG. 3, phase windings A, B and C have inductances shown as L1, L2 and L3, respectively. As an example, motor 304 may have the configuration shown in FIG. 2. However, the control and adjustment techniques described herein may be applied to other electric motor arrangements, i.e., having different numbers of permanent magnets and electromagnets.

Driver 302 may include an arrangement (e.g., H-bridge) of switch devices S1, S2, S3, S4, S5 and S6 (e.g., transistors). A motor controller 306, which may correspond to motor control system 100 of FIG. 1, is coupled to control the switches of driver 302 to generate the phase voltages $V_A$, $V_B$, and $V_C$ which are generally out-of-phase from each other. In the illustrated example, there are three upper switches S1, S3, and S5 connected to a high voltage supply V+ and three lower switches S2, S4, and S6 connected to a low voltage (e.g., ground). The upper switches S1, S3, and S5 and the lower switches S2, S4, and S6 work in conjunction to supply the phase currents to the phase windings, which generate corresponding phase voltages $V_A$, $V_B$, and $V_C$.

As disclosed herein, motor controller 306 is configured to perform the functions described above. To that end, motor controller 306 may include the functionality of measurement logic 104, detection logic 106 and control logic 108. That is, motor controller 306 may include suitable circuitry, e.g., sample-and-hold circuits, ADCs, and comparators. Based on these operations, motor controller 306 may supply control signals to switches S1-S6 in a prescribed order to generate the three phase currents and the three phase voltages ($V_A$, $V_B$ and $V_C$) to power electromagnets 202 in stator 204 to effect desired movement of rotor 208.

Figure 4:
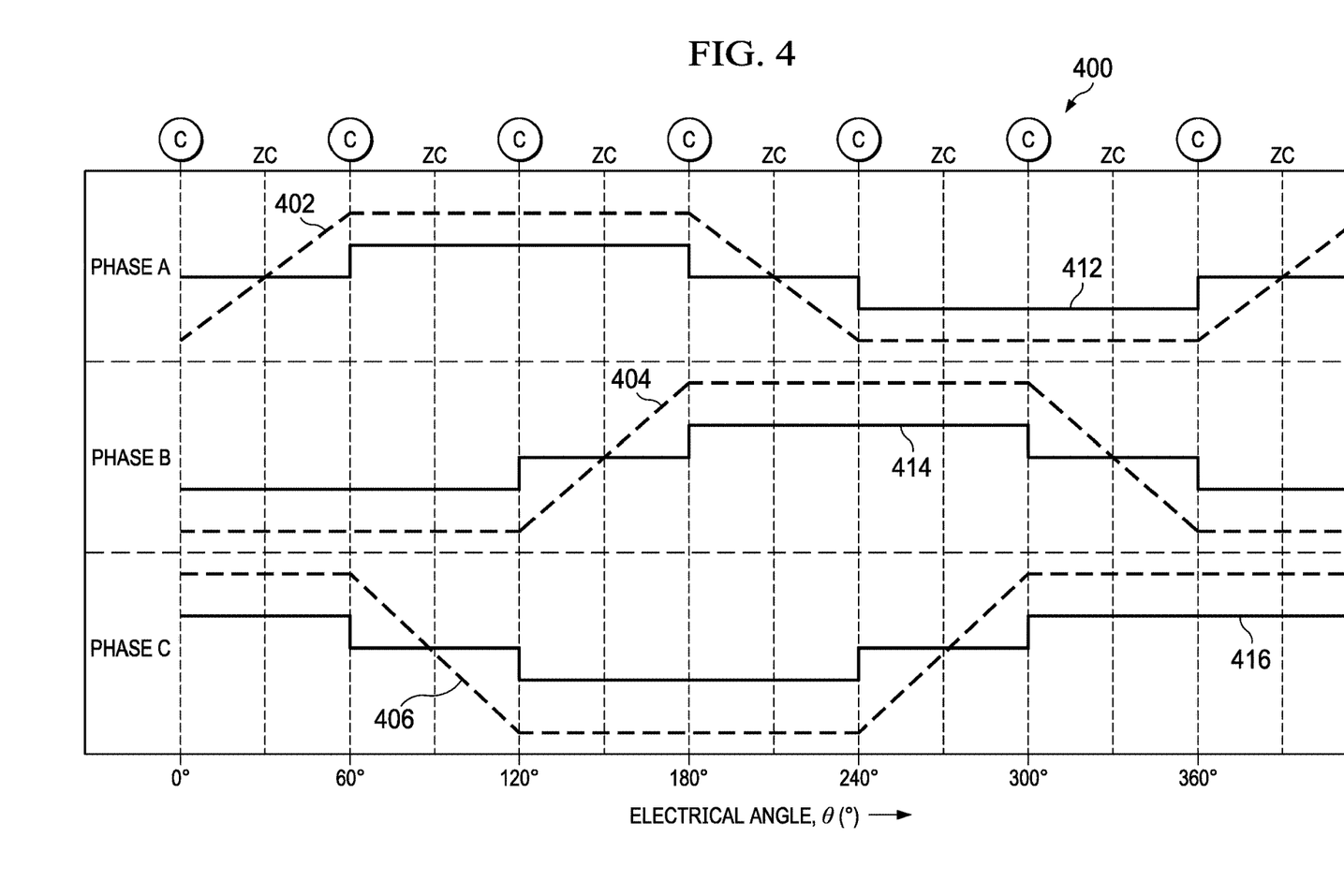
FIG. 4 is a graphical representation of phase voltages and phase currents of a three-phase BLDC electric motor over an electrical cycle.

FIG. 4 is a graph 400 illustrating exemplary phase voltage and current waveforms of a three-phase BLDC electric motor, such as motor 102/304, for one electrical cycle of 360 degrees. The phase voltage and phase current for each of the three phases A, B and C are shown. Each phase is driven for approximately 120 degrees in one electrical cycle. Each phase voltage also floats for two separate 60-degree periods in each electrical cycle. In the illustrated example, one floating component of phase A voltage 402 occurs between 0 degrees and 60 degrees and the other occurs between 180 degrees and 240 degrees. In this example, the two floating components of phase B voltage 404 occur between 120 degrees and 180 degrees and between 300 degrees and 360 degrees, respectively. Phase C voltage 406 floats in the 60 to 120 degree interval and in the 240 to 300 degree interval in this example. The phase currents for phases A, B and C are identified by reference numerals 412, 414 and 416, respectively. Commutation points, identified by © in FIG. 4, generally occur at an interval of 60 electrical degrees at each phase current transition.

As shown in FIG. 4, one floating phase of each of phase voltages A, B and C ramps up (positive slope) and the other ramps down (negative slope). A BEMF ZC point (ZC) generally occurs at approximately the mid-point voltage of the ramping floating phase voltage. While the relatively high-level view of FIG. 4 shows each of the floating phase voltage ramps as linear, that is merely an approximation. At the beginning of each ramp period, the floating phase voltage is usually clamped. Knowing each clamping period (and thus the degauss time period) and the settling time of the phase voltage after the clamping period, enables more accurate determination of BEMF ZC points.

Figure 5:
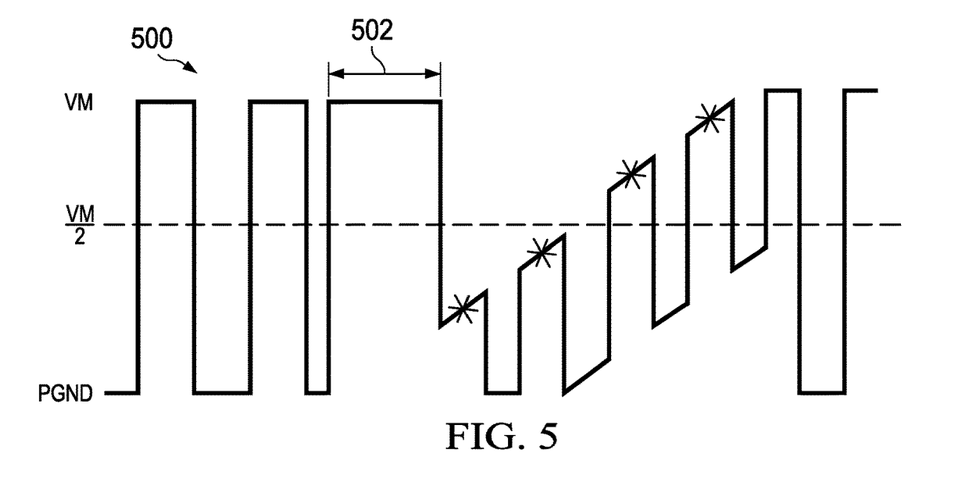
FIG. 5 is graph showing pulses of an exemplary ramp-up floating phase voltage including its degauss time period after commutation, during which the floating phase voltage is clamped to VM by the negative outgoing phase current during increasing BEMF.
Figure 6:
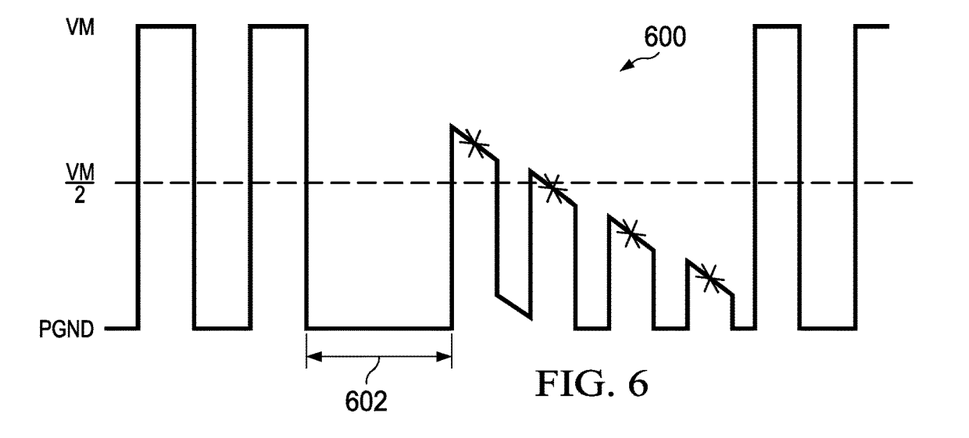
FIG. 6 is a graph showing pulses of an exemplary ramp-down floating phase voltage including its degauss time period after commutation, during which the floating phase voltage is clamped to ground, e.g., power ground (PGND), by the positive outgoing phase current during decreasing BEMF.

FIG. 5 shows pulses of an exemplary floating phase voltage 500 ramping up and that includes a degauss time period 502 after commutation, during which floating phase voltage 500 is clamped to VM by the negative outgoing phase current during increasing BEMF. FIG. 6 shows pulses of an exemplary floating phase voltage 600 ramping down that includes a degauss time period 602 after commutation, during which floating phase voltage 600 is clamped to ground, e.g., power ground (PGND), by the positive outgoing phase current during decreasing BEMF. In the graphs of FIGS. 5 and 6, VM represents the maximum voltage of the phase voltage and may be the value of the positive supply voltage (Vcc) of motor 102/304.

When BEMF is increasing, as shown in FIG. 5, degauss time period 502 may be identified by sampling floating phase voltage 500 during that time frame and comparing the sampled values with Vcc. When the comparison indicates (after a minimum number of reliable samples are compared, e.g., 2 or 3 samples) that floating phase voltage 500 is less than the Vcc reference by a suitable amount, it may be determined that floating phase voltage 500 is no longer clamped and that degauss time period 502 has ended. Alternatively, or in addition to voltage sampling and comparison, such determination may be made by sampling the outgoing phase current and comparing the sampled values to zero. When that comparison indicates that such current has dropped to at or near zero, it may be determined that floating phase voltage 500 is no longer clamped and that degauss time period 502 has ended. The sampling may be carried out with an analog-to-digital converter (ADC) that includes a sample-and-hold circuit and the comparison may be done using one or more suitable comparators, which components may be embodied in motor control system 100 and motor controller 306.

When BEMF is decreasing, as shown in FIG. 6, degauss time period 602 may be identified by sampling floating phase voltage 600 during that time frame and comparing the sampled values with ground (e.g., zero voltage). When that comparison indicates (after a minimum number of reliable samples are compared, e.g., 2 or 3 samples) that floating phase voltage 600 is greater than the ground reference by a suitable amount, it may be determined that floating phase voltage 600 is no longer clamped and that degauss time period 602 has ended. Alternatively, or in addition to voltage sampling and comparison, such determination may be made by sampling the outgoing phase current and comparing the sampled values to zero. When that comparison indicates that such current has dropped to at or near zero, it may be determined that floating phase voltage 600 is no longer clamped and that degauss time period 602 has ended. The sampling may be carried out with an analog-to-digital converter (ADC) that includes a sample-and-hold circuit and the comparison may be done using one or more suitable comparators, which components may be embodied in motor control system 100/motor controller 306.

In both situations (increasing and decreasing BEMF), sampling of the floating phase voltage to detect BEMF ZC begins after the degauss time period for more accurate BEMF ZC detection. In each of FIG. 5 and FIG. 6, a series of exemplary sampling points to detect BEMF ZC is identified by *.

Figure 7A:
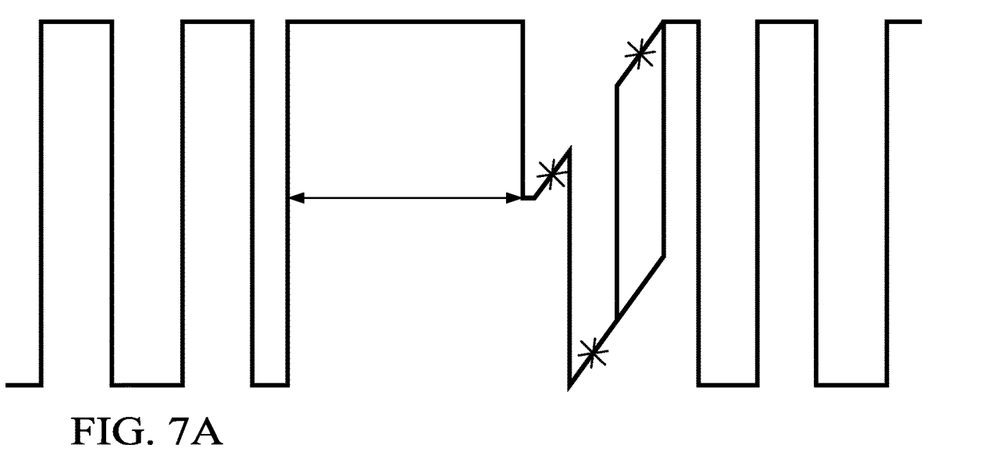
FIGS. 7A and 7B are graphs showing pulses of exemplary floating phase voltages in which the degauss time period in each exceeds a set number of, e.g., 30, electrical degrees.
Figure 7B:
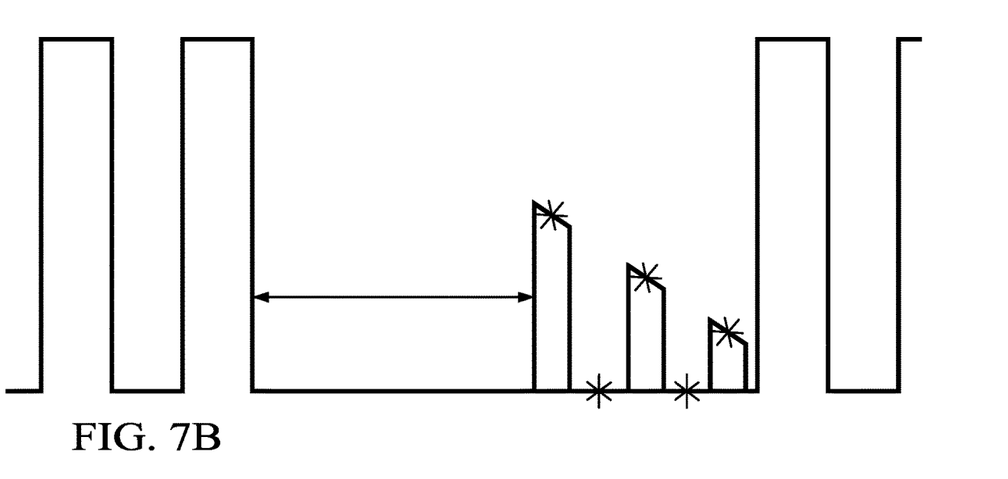

In cases in which the sample comparisons indicate that floating phase voltage is not significantly changing, i.e., remains clamped, generally means that BEMF ZC is within the degauss time or settling time period, which has exceeded a set number of electrical degrees, e.g., 30 degrees. Each of FIGS. 7A and 7B is a graphical representation of the floating phase voltage with respect to electrical degrees. FIGS. 7A and 7B (collectively, FIG. 7) show scenarios in which the applicable reference test is not being met even after multiple comparisons of sampled values. In FIG. 7A this occurs with a positive slope during increasing BEMF, and in FIG. 7B this occurs with a negative slope during decreasing BEMF. In both cases, because the BEMF ZC has lapsed, sampling of the floating phase voltage as indicated by * in FIG. 7 after the degauss time period indicated by the double-sided arrows in FIG. 7 would not result in detection of the ZC.

FIGS. 5-7 each show the ideal case in which the floating phase voltage drops or rises quickly after the degauss time period. In practice, however, there is usually a settling time, during which the floating phase voltage gradually drops or rises to a point where approximate linear ramping begins, which reveals the true BEMF information. Thus, in examples, in addition to identifying a clamped time period (corresponding to a degauss time period) for each BEMF portion of a floating phase voltage, a settling time period immediately following the clamped time period is also identified. Then, after it is determined that the settling time period has ended and that the portion floating phase voltage that holds true BEMF information has started, the floating phase voltage is sampled to detect BEMF ZC.

Figure 8A:
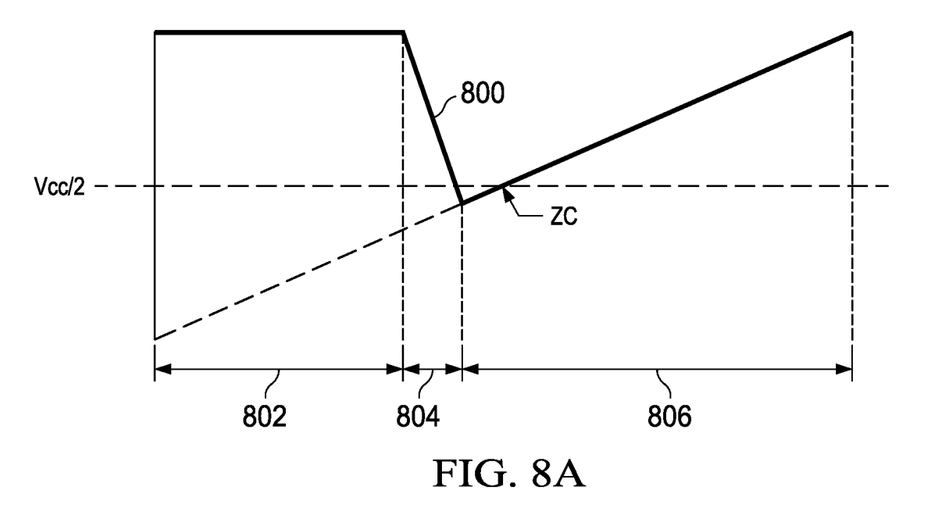
FIGS. 8A and 8B are graphs showing floating phase voltages in scenarios in which BEMF zero-crossing (ZC) can be determined based on the degauss and settling time periods.
Figure 8B:
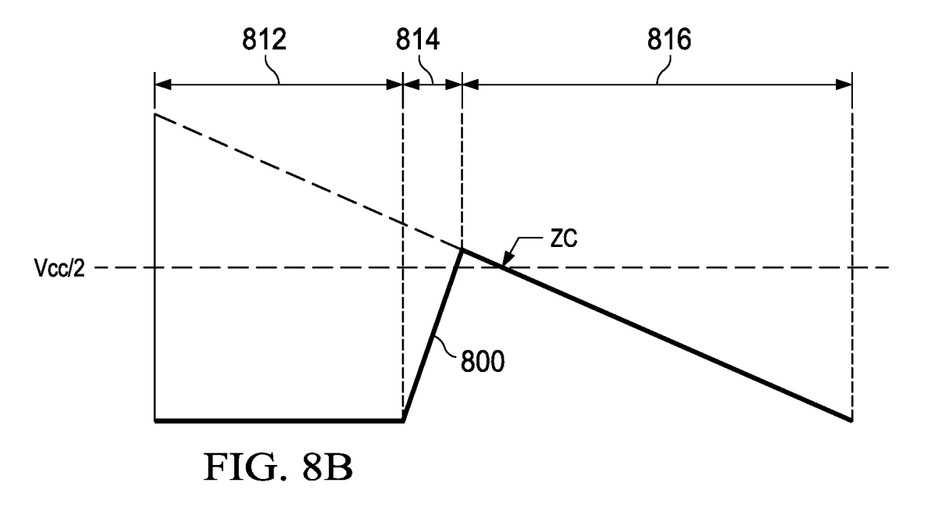

FIGS. 8A and 8B (collectively, FIG. 8) show a floating phase voltage 800 with a settling time and a degauss time period 802/812 of less than a set number of electrical degrees, e.g., 30 electrical degrees. FIG. 8A shows the situation of increasing BEMF, and FIG. 8B shows the situation of decreasing BEMF. In FIG. 8A, there is degauss time period 802, a settling time period 804, and a true floating time period 806, during which the ZC occurs. In FIG. 8B, degauss time period 812 is followed by settling time period 814, and then true floating time period 816, during which the ZC occurs in that situation.

To consider a more gradual drop or rise of the floating phase voltage from the clamped voltage, once it is determined that floating phase voltage 800 is no longer clamped (post voltage clamp detection, e.g., after 802 or 812), the floating phase voltage is sampled during that time window. Each of the post voltage clamp detection samples is compared with a predefined threshold, which is set based on the ON/OFF PWM state of motor 102/304, the modulation scheme and whether the BEMF is increasing or decreasing. The following table shows the predefined thresholds for eight (8) different conditions.

| BEMF Voltage Slope | Modulation | ON PWM State | OFF PWM State |
|---|---|---|---|
| Increasing | High Side | <Vcc/2 | ≤0 V |
| Decreasing | High Side | >Vcc/2 | >0 V |
| Increasing | Low Side | ≤Vcc | <Vcc/2 |
| Decreasing | Low Side | ≥Vcc/2 | >Vcc/2 |

FIG. 8A illustrates the condition set of increasing BEMF voltage slope, high side modulation and ON PWM state. Thus, after degauss time period 802, the floating phase voltage samples are each compared to Vcc/2, and in particular to determine whether the floating phase voltage drops below Vcc/2. FIG. 8B illustrates the condition set of decreasing BEMF voltage slope, high side modulation and ON PWM state. Thus, after degauss time period 812, the floating phase voltage samples are each compared to Vcc/2, and in particular compared to determine whether the floating phase voltage is above Vcc/2. Referring back to FIGS. 5 and 6, the sampled values, indicated by *, are taken during PWM ON state. Alternatively, or in addition, sampled values in either scenario (increasing or decreasing BEMF) could also be taken during PWM OFF state.

In each of these post voltage clamp comparisons (FIGS. 8A and 8B), it is determined whether the condition is satisfied with a set number of samples (e.g., 2 or 3) for reliability. If so, sampling of floating phase voltage 800 continues, and when the sampling indicates that the slope of floating phase voltage 800 changes direction, that inflection point indicates the start of true floating time period 806/816. Thus, sampling of floating phase voltage 800 continues to detect the ZC in true floating time period 806/816. If the condition is not satisfied with a set number of samples, it is possible that the degauss time period alone, or plus the settling time period when it exists, has exceeded a set number of electrical degrees, e.g., 30 degrees and thus the ZC may not be detectable by further sampling of the floating phase voltage.

FIGS. 8A and 8B illustrate example scenarios in which floating phase voltage 800 crosses a threshold mark, e.g., Vcc/2. Variations within those scenarios may occur. For example, in the case of increasing BEMF (e.g., FIG. 8A), floating phase voltage 800 may drop further before beginning to rise. Similarly, in the case of decreasing BEMF (e.g., FIG. 8B), floating phase voltage 800 may rise further before beginning to drop.

Figure 9A:
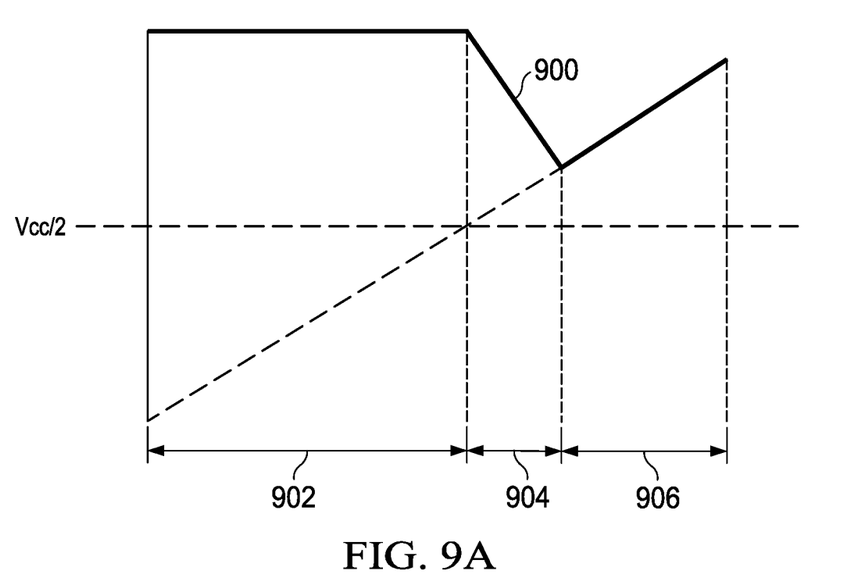
FIGS. 9A and 9B are graphs showing floating phase voltages in scenarios in which BEMF ZC is to be determined by an error compensation method.
Figure 9B:
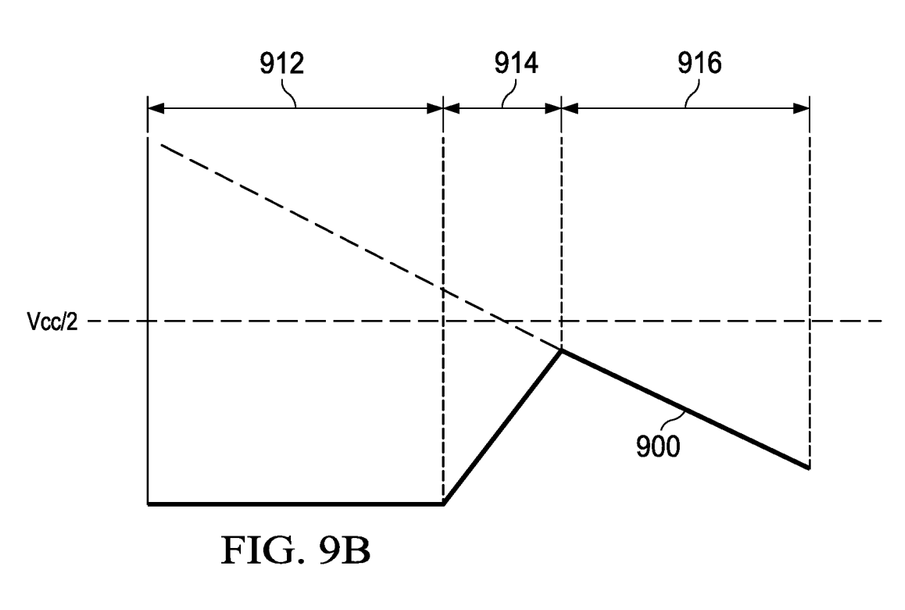

FIGS. 9A and 9B (collectively, FIG. 9) each show such a scenario in which the threshold test condition is not being met. As can be seen in FIG. 9A, which is an increasing BEMF scenario, after degauss time period 902, floating phase voltage 900 does not drop below Vcc/2. As shown in FIG. 9B, which is a decreasing BEMF scenario, after degauss time period 912, the floating phase voltage does not rise above Vcc/2. Settling time periods for the scenarios of FIGS. 9A and 9B are identified by reference numerals 904 and 914, respectively. In FIG. 9A, after settling time period 904, floating phase voltage 900 starts to rise in time period 906 without crossing Vcc/2, and in FIG. 9B, after settling time period 914, floating phase voltage 900 starts to fall in time period 916 without crossing Vcc/2. In the scenarios depicted in FIG. 9, the commutation point and ZC may be determined based on the BEMF in time periods 906 and 916.

In each case, floating phase voltage 900 is sampled after degauss time period 902/912 to determine whether the slope of the floating phase voltage inverts, i.e., changes direction. If so, the inflection point may be deemed the end of the combined degauss time period and settling time period, and it may be determined that the degauss and settling time periods together has exceeded, e.g., 30 electrical degrees, in which case BEMF ZC information is not directly available. Identifying such cases enables accurate motor control, e.g., accurate commutation detection, in a wider variety of operating conditions. In such cases, BEMF ZC may be estimated or determined using an error compensation method, such as interpolation of ZC based on the slope of the BEMF portion of the floating phase voltage o estimation of ZC based on the degauss angle.

Once BEMF ZC information is obtained, it may be used to control motor 102/304. For example, BEMF information together with commutation information may be used transition motor 102/304 from open-loop operation to closed-loop operation. Such control may be performed as described in co-pending application Ser. No. 17/359,158, entitled "OPERATIONAL TRANSITION CONTROL OF MOTOR", filed Jun. 25, 2021, the content of which is incorporated by reference herein. BEMF ZC information may be used to control motor 102/304 in other ways as well.

Figure 10:
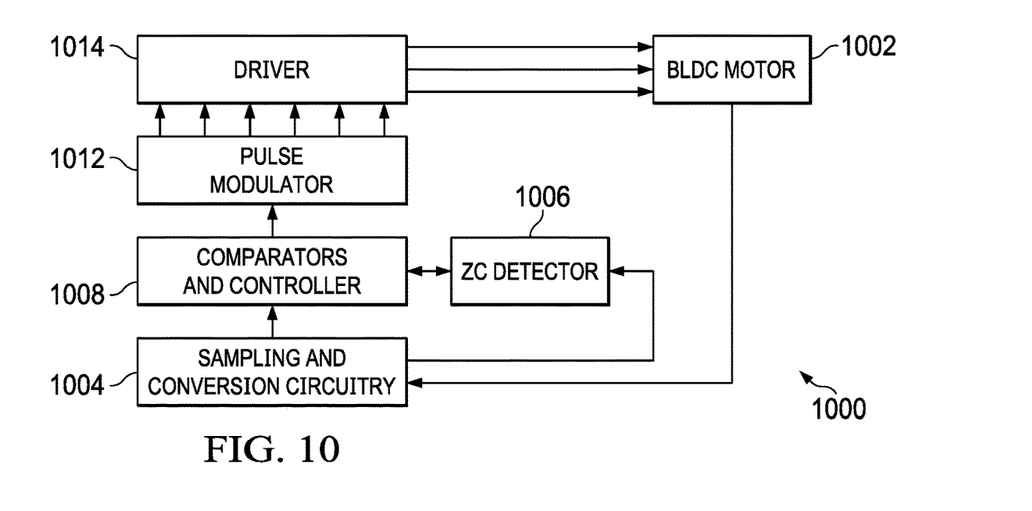
FIG. 10 is a block diagram illustrating components of, and process flow in, an example multi-phase electric BLDC motor system for detecting or determining BEMF ZC in a floating phase voltage.

FIG. 10 is a block diagram 1000 illustrating components of, and process flow in, an example multi-phase electric BLDC motor system for detecting or determining BEMF ZC in a floating phase voltage. During operation, e.g., open-loop startup, the phase voltages, e.g., $V_A$, $V_B$ and $V_C$, as well as the corresponding phase currents, of BLDC motor 1002 (which may correspond to motor 102/304) are sampled by sampling and conversion circuitry 1004 (e.g., embodied in measurement logic 104). A ZC detector 1006 is coupled to circuitry 1004 to detect ZC locations or points in each BEMF voltage after the true BEMF portion of the corresponding floating phase voltage is determined. Comparators and controller 1008, which may embody part of the control functionality of control logic 108 and/or motor controller 306, compare the sampled values as described above to determine, for each floating phase voltage, a clamping time period, which corresponds to a degauss time period, a settling time period, and a period when that floating phase voltage holds true BEMF information. In cases in which the floating phase voltage is clamped for approximately 30 degrees or less, ZC detector 1006 may be enabled, once the start of the portion of that floating phase voltage holding true BEMF information is identified, to detect the BEMF ZC point. In cases in which the floating phase voltage is clamped for, e.g., more than 30 electrical degrees, and thus the degauss time period is greater than 30 electrical degrees, the controller of block 1008 determines, using an error compensation method, the BEMF ZC point in each such degauss time period.

A pulse modulator 1012 is coupled to, and receives control signals from, the controllers of block 1008. Based on the control signals, which may include BEMF ZC detection points as well as detected commutation points, pulse modulator 1012 modulates the phase currents and phase voltages of BLDC motor 1002. This information is transmitted to a driver 1014 that supplies the phase currents to phase windings, e.g., phase windings A, B and C, of BLDC motor 1002 to change acceleration of, or otherwise control, BLDC motor 1002 accordingly.

Figure 11:
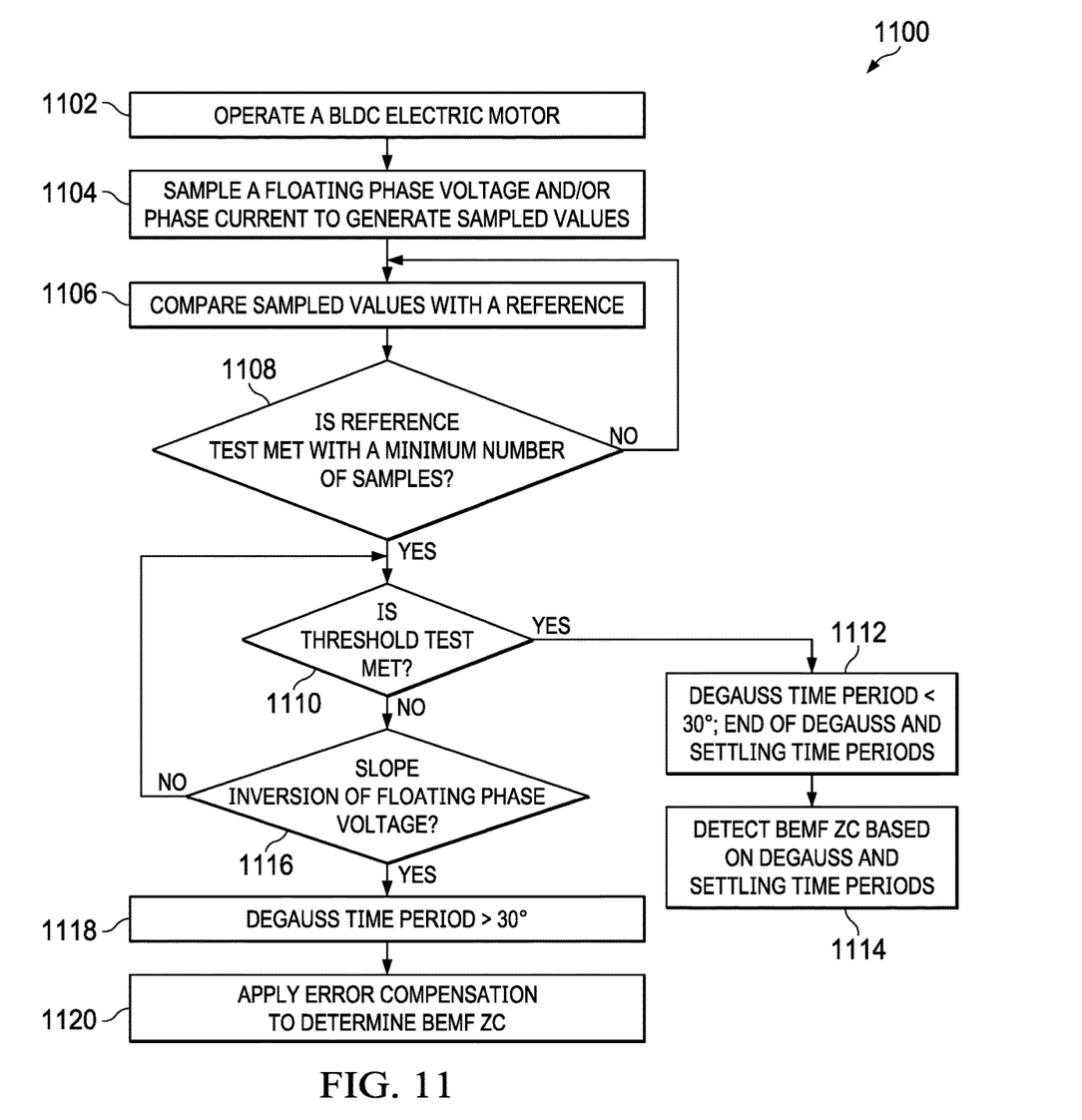
FIG. 11 is a flow diagram illustrating an example of operating an electric motor to determine whether BEMF ZC can and is to be detected based on identified degauss and settling time period or whether BEMF ZC is to be determined by an error compensation method.

FIG. 11 is a flow diagram of an example method 1100 of operating an electric motor, e.g., a three-phase, electric BLDC motor, to determine whether BEMF ZC can and is to be detected based on identified degauss and settling time periods or whether BEMF ZC is to be determined by an error compensation method. Initially, the BLDC electric motor is operated, e.g., in open-loop (start-up) mode, (1102). During such operation, the floating phase voltage and/or outgoing phase current of the motor are sampled to generate sampled values (1104). These sampled values are then compared with an appropriate reference as described above (1106).

As the comparison continues for a particular floating phase voltage segment, it is determined whether the reference test is being met with a minimum number of samples (1108). The minimum number of samples may be 2 or 3. If so, the sampling continues and the sampled values are compared to a threshold, as described above, and it is determined whether the threshold test is met (1110). If so, the degauss time period (plus the settling time period) is less than 30 electrical degrees, and it may be determined that both have ended (1112). The floating phase voltage is then sampled to detect BEMF ZC (1114).

Returning to operation 1110, if the threshold test is not met, the floating phase voltage is sampled to detect an inversion (as shown in FIGS. 9A and 9B) in operation 1116. If an inversion is detected, then it is determined that the degauss time period (plus any settling time period) has exceeded 30 electrical degrees (1118). In that case, error compensation is applied to determine or estimate the BEMF ZC that occurred within the degauss time period (1120). If a slope inversion is not detected, flow continues with operation 1110.

BEMF ZC information, together with commutation point information, may then be used to control the electric motor. For example, such information may be used to determine when to switch the motor to a closed-loop (run) operation.

FIG. 11 depicts one possible order of operations in identifying a degauss time period, and detecting or determining a BEMF ZC whether it occurred during or after the degauss time period. Not all operations need necessarily be performed in the order described. Some operations may be combined into a single operation. Additional operations may be performed as well.

Accurately identifying a degauss time period and a following settling time period, as described herein, enables accurately tracking of the rotor position to deliver peak load torque performance. Such identification also enables an associated electric motor to achieve very rapid start-up, e.g., less than 30 ms. Features described herein also enable sensorless operation of electric motors with a very high electrical time constant, where the degauss time period can exceed 30 electrical degrees, in which case ZC information is estimated. Features and aspects described herein may be used in a wide variety of applications, particularly those that require very high acceleration, e.g., fuel pumps, power tools, etc.

The term "coupled" is used throughout the specification. The term and derivatives thereof may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon FET ("MOSFET") may be used in place of an n-type MOSFET with little or no changes to the circuit. Furthermore, other types of transistors may be used (such as bipolar junction transistors (BJTs)) instead of, or in addition to, MOSFETs.

Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

Uses of the phrase "ground" in the foregoing description include a chassis ground, a power ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value. Also, each of the references used herein, e.g., zero current, Vcc, ground, may be +/−10 percent of the actual value, and in determining whether a comparison with a reference or threshold is met, a suitable minimum deviation from the reference/threshold may be required.

Modifications of the described examples are possible, as are other examples, within the scope of the claims. Moreover, features described herein may be applied in other environments and applications consist with the teachings provided.

What is claimed is:

1. A process of operating an electric motor, comprising:
   sampling an electrical quantity of the electric motor at a plurality of different times to generate sampled values;
   comparing each of the sampled values with a reference to identify a clamped time period during which a magnitude of one or more pulses of a floating phase voltage of the electric motor are clamped to a set value by an outgoing phase current of the electric motor;
   identifying a degauss time period based on the comparing; and
   detecting a back-electromotive force (BEMF) zero-crossing (ZC) based on the identified degauss time period.

2. The process of claim 1, wherein the electrical quantity is a floating phase voltage, and the reference is one of a value of a supply voltage of the electric motor and ground.

3. The process of claim 2, wherein the reference is the value of the supply voltage when BEMF is increasing.

4. The process of claim 1, wherein the electrical quantity is an outgoing phase current, and the reference is zero current.

5. The process of claim 1, further comprising:
   after the degauss time period is identified, comparing sampled values of the floating phase voltage with a set threshold, the set threshold based on a slope of the floating phase voltage after the degauss time period, a modulation scheme being used in operation of the electric motor, and a pulse width modulation ON/OFF state of the electric motor.

6. The process of claim 5, further comprising:
   identifying a settling time period, after the degauss time period, during which the floating phase voltage settles relative to the set value to a beginning ramping value at which the floating phase voltage begins to ramp, based on the comparing after the degauss time period.

7. A process of operating an electric motor, comprising:
   sampling an electrical quantity of the electric motor at a plurality of different times to generate sampled values;
   comparing each of the sampled values obtained during an initial time period to a reference in a reference test; and
   determining whether the reference test is met with a set number of compared sample values;
   identifying the degauss time period and a settling time period following the degauss time period, when the reference test is met with the set number of compared sampled values;

detecting whether a slope of a floating phase voltage of the electric motor has inverted, when the reference test is not met with the set number of compared sampled values; and determining a back-electromotive force (BEMF) zero-crossing (ZC) with respect to the floating phase voltage.

8. The process of claim 7, wherein the determining of the BEMF ZC includes determining that the BEMF ZC occurred during the degauss time period based on detecting that the slope of the floating phase voltage has inverted, when the reference test is not met with the set number of sampled values.

9. The process of claim 8, further comprising:
applying error compensation to determine the BEMF ZC within the degauss time period.

10. The process of claim 7, wherein the BEMF ZC is determined based on the identified degauss and settling time periods, when the reference test is met with the set number of sampled values.

11. The process of claim 7, wherein the set number of sampled values is 3.

12. The process of claim 7, further comprising:
comparing each of the sampled values of the electrical quantity obtained after the degauss time period is identified to a threshold in a threshold test; and
determining that the degauss period is less than a set number of electrical degrees when the threshold test is met.

13. The process of claim 12, wherein the degauss time period and the settling time period are identified based on the reference and threshold tests.

14. The process of claim 7, further comprising:
tracking position of a rotor of the electric motor based on the determined BEMF ZC.

15. A system comprising:
measurement logic configured to sample an electrical quantity of an electric motor at a plurality of different times to generate sampled values;
detection logic coupled to the measurement logic; and
control logic coupled to the measurement and detection logic, the control logic configured to identify a degauss time period during which a magnitude of pulses of a floating phase voltage of the electric motor is clamped to a set value by an outgoing phase current of the electric motor, and to identify a settling time period, following the degauss time period, during which the floating phase voltage settles from the set value to a beginning ramping value at which the floating phase voltage begins to ramp.

16. The system of claim 15, wherein the detection logic includes a zero crossing (ZC) detector that is selectively enabled by the control logic to detect a back-electromotive force (BEMF) zero-crossing (ZC) with respect to the floating phase voltage.

17. The system of claim 16, wherein the control logic is configured to enable the ZC detector after the degauss time period and the settling time period are identified.

18. The system of claim 15, wherein the control logic includes at least one comparator configured to compare the sampled values obtained before identification of the degauss time period with a reference and to compare sampled values obtained after identification of the degauss time period with a threshold.

19. The system of claim 15, wherein the measurement logic includes sampling and conversion circuitry and the control logic includes a controller.

20. The system of claim 19, further comprising a pulse modulator coupled to the controller.

* * * * *